(12) United States Patent
Thomsen et al.

(10) Patent No.: US 9,701,236 B2
(45) Date of Patent: Jul. 11, 2017

(54) TRANSPORT AND STACKING OF WIND TURBINE BLADES

(71) Applicant: Vestas Wind Systems A/S, Aarhus N. (DK)

(72) Inventors: Peter Frans Thomsen, Ringkobing (DK); Anton Bech, Ringkøbing (DK); Birger Keseler, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/022,063

(22) PCT Filed: Sep. 9, 2014

(86) PCT No.: PCT/DK2014/050278
§ 371 (c)(1),
(2) Date: Mar. 15, 2016

(87) PCT Pub. No.: WO2015/035997
PCT Pub. Date: Mar. 19, 2015

(65) Prior Publication Data
US 2016/0221488 A1    Aug. 4, 2016

(30) Foreign Application Priority Data

Sep. 16, 2013   (DK) .................................. 2013 70509
Mar. 6, 2014    (DK) .................................. 2014 70110

(51) Int. Cl.
*B60P 7/08*     (2006.01)
*B60P 3/40*     (2006.01)
*F03D 13/40*    (2016.01)

(52) U.S. Cl.
CPC ................ *B60P 3/40* (2013.01); *F03D 13/40* (2016.05); *Y02E 10/72* (2013.01)

(58) Field of Classification Search
CPC ............. B60P 3/40; F03D 1/005; Y02E 10/72
(Continued)

(56) References Cited

U.S. PATENT DOCUMENTS

| 2010/0221084 | A1 | 9/2010 | Wobben |
| 2011/0131809 | A1 | 6/2011 | Riddell et al. |
| 2013/0216325 | A1* | 8/2013 | Johnson .......................... 410/44 |

FOREIGN PATENT DOCUMENTS

| DK | 176923 B1 | 5/2010 |
| EP | 1813473 A2 | 8/2007 |

(Continued)

OTHER PUBLICATIONS

Danish Patent and Trademark Office, Search Report issued in Application No. PA 2014 70110 dated Oct. 20, 2014.
(Continued)

*Primary Examiner* — Stephen Gordon
(74) *Attorney, Agent, or Firm* — Wood Herron & Evans LLP (57) ABSTRACT

A method of transporting a blade for a wind turbine generator, includes attaching a blade root support frame to a root flange of the blade and attaching a blade spanwise support frame to a spanwise portion of the blade, connecting a first wheel base to the spanwise support frame, and connecting a transport unit to the root support frame. In another aspect, the blades may be stacked by use of the support frames without use of further equipment.

23 Claims, 11 Drawing Sheets

(58) Field of Classification Search
USPC .......... 410/44, 45, 32–35, 53, 120; 280/404
See application file for complete search history.

(56) References Cited

FOREIGN PATENT DOCUMENTS

| | | |
|---|---|---|
| EP | 2594430 A1 | 5/2013 |
| EP | 2669507 A1 | 12/2013 |
| WO | 2004041589 A1 | 5/2004 |
| WO | 2008004195 A2 | 1/2008 |

OTHER PUBLICATIONS

European Patent Office, International Search Report and Written Opinion issued in International Application No. PCT/DK2014/050278 dated Feb. 3, 2015.

* cited by examiner

TRANSPORT AND STACKING OF WIND TURBINE BLADES

The present invention relates to a method and a kit for transporting a wind turbine blade as well a method of stacking blades.

BACKGROUND

Today wind turbine blades are transported by trucks furnished with sophisticated and expensive special equipment. This is due to the weight and size of the blades, which continue to increase and is approaching lengths near 100 meters. Earlier, when the blades were shorter, an ordinary flatbed trailer could be used.

Known today is a way of transporting a blade as shown in Danish Patent 176923 B1, where a large frame is connected to the blade root. Hydraulic jacking equipment located on a truck is connected to the frame in order to lift, hold and draw the blade root for transport. Also, a non-driven dolly is used as a spanwise support for the blade tip. As the hydraulic jacking equipment is located as well as supported on the truck, the load from the blade weight on the truck becomes very high. This is critical with respect to axle pressure exerted by the truck on the road, which is limited by statute. Also, as the load is high and the truck, in such a configuration, has to be situated away from the blade root, the jacking equipment necessarily has to exert large forces and torque on the blade root and thereby on the blade.

Hence, a simplified method of transport would be advantageous, which decreases axle pressure on the vehicle and exert less force and torque on the blade, as well as a simplified method for stacking of blades for sea transport.

Also, as the offshore wind market is increasing, there is a need for improved stacking of blades for sea transport. One known method is described in U.S. Pat. No. 8,602,700, which shows a system of double frames, where inner frames alone is used for land transport and additional, outer frames along with the inner frames must be provided for stacking of blades for sea transport.

It is a further object of the present invention to provide an alternative to the earlier art.

SUMMARY

An aspect of the invention involves a method of transporting a blade for a wind turbine generator, the method comprising
  attaching a blade root support frame to a root flange of the blade, where
    the root support frame includes a main support part, which is supported by at least two legs, and an attachment part adapted for being attached to the root flange of the blade, and
    a coupling part arranged for being connected to a transport unit, and
  attaching a blade spanwise support frame to a spanwise portion of the blade, where
    the spanwise support frame includes a cradle-like support part adapted to engage and support a spanwise surface part of the blade, and
    where the spanwise support frame includes a receiving part arranged for receiving a first wheel base with at least two axles and four wheels, and
  connecting the first wheel base to the spanwise support frame, and
  connecting a transport unit to the root support frame, where
    the transport unit includes a carrying structure and at least one second wheel base with at least one axle and two wheels, and
    where the transport unit before being connected to the root support frame, is moved into a position partly underneath the blade root, and where the second wheel base is underneath the blade and the carrying structure is underneath the root support frame.

One end of the blade, i.e. the root end, may be raised to a transport position using the transport unit. When a standard truck or tractor is connected to the transport unit, a standard pneumatic or hydraulic lifting arrangement, which is normally used for raising standard trailers, may be used to raise one end of the transport unit and thereby the root support frame, and hence the root end of the blade. As the transport unit is moved into a position underneath the blade, such that the second wheel base is underneath the blade and the carrying structure is underneath the root support frame, the load from the root end of the blade is distributed between the truck or tractor and the second wheel base, which lowers the axle pressure of the truck or tractor. Moreover, as the carrying structure is underneath the root support frame, only vertical load may be applied from the transport unit, such that forces and torque applied on the blade are substantially decreased compared to the known art. In order to connect the first wheel base to the spanwise support frame, a forklift truck or a crane may be used to elevate the blade to a suitable position. The described method is particularly suited for bringing blades from a site of manufacture to a seaside storage and off-shipping area, as the transport unit and the first wheel base may be used again and again. This is of economic benefit compared to having a great number of transport units and wheel bases, which would follow and stay with each blade. Also the forklift truck or the crane may then stay in the area and be used also again and again.

The cradle-like support part may supported by at least two legs, which are movable between at least a support position and a transport position as well as vice versa, and where movement of the legs is performed manually or using a power source. Such legs may be used for keeping the spanwise part of the blade away from the ground. This makes it easier to engage the blade with a forklift truck or a crane. Also, when the blade is kept away from the ground, discoloration and increased drag due to mildew may be avoided.

A part of the blade as well as the spanwise support frame may be lifted upwards and away from ground before the first wheel base is connected, where the lift is performed by extending the at least two legs to a blade lift position, which is higher than a support position. Using the legs to lift the spanwise support frame and part of the blade enables connection and disconnection of the first wheel base without use of additional means, such as a forklift truck or a crane. The lifting operation may be done using a hydraulic power supply. The actual lift necessary may be in a range from 0.05-0.15 meters. Such a configuration is suited for storage combined with road transport, where it is beneficiary to dispense with a forklift truck or a crane, where two would be needed. One at a storage facility near a site of manufacture of the blade, and one at the site, whereto the blades are transported. Such two cranes or forklift trucks would have a quite low degree of utilization.

The root support frame and the spanwise support frame may be attached to the blade before the blade is transported away from its site of manufacture. This means that a crane may not be needed for further transport of the blade, when a first wheel base, a truck or tractor and optionally a transport unit is available. One exception may though be regarding sea transport, in case the sea carrier is not of a roll on-roll off type, but cargo has to be lifted on board. In such a case lifting slings may be wrapped around the blade at the positions of the support frames, which may then secure that the slings do not slide or change position during lift. Also, as the support frames are not used as lifting anchors, they do not need to be tested and approved for such use.

The attachment part of the root support frame is preferably connected to a lowermost part of the blade root flange. This makes it easy to connect and disconnect the blade from the root support frame, as use of ladders for reaching high attachments are avoided and may be done from the ground.

The root support frame and the spanwise support frame may remain attached to the blade for road transport and/or sea transport and/or rail transport as well as any interim temporary storage, until the blade is to be installed on a wind turbine, where blade is attached to a crane and the root support frame and the spanwise support frame are removed. This means that the blade may rest safely and securely on the support frames at all time, until installation. The support frames may be used for transporting the blade on road by use of first wheel base, a truck or tractor and a transport unit. The support frames may also be used for rail transport, as the support frames may be engaged with securing means on the rail transport system. Also, the support frames may be used for attaching the blade in a stacking system on a sea carrier. Moreover, the support frames may be used for supporting the blade during storage. Hence, the support frames are very versatile as they are useful in all these situations. This is particularly expressed, when compared to having to grip or engage the blade with different means every time the blade has to be moved from one place to another.

In a further aspect of the invention, the root support frame and the spanwise support frame may have legs extending both downwards and upwards to provide support for a further root support frame and spanwise support frame, where the legs extending upwards provide support for legs extending downwards of the further root support frame and spanwise support frame, and wherein lengths of the legs of the root support frame and spanwise support frame as well as the further root support frame and spanwise support frame are adapted to facilitate stacking of a lower blade and an upper blade on top of each other, and each being supported by the root support frame and spanwise support frame and the further root support frame and spanwise support frame, respectively. This allows stacking of blades in particular for sea transport without pre-installed support arrangements on the ship or barge, or additional further framework for securing the blades.

The method may involve that any number of root support frames and spanwise support frames as well as further support frames are provided with legs extending upwards to provide support for additional root support frames and spanwise support frames to facilitate a predetermined number of blades to be stacked on top of each other. This allow any number of blades to be stacked.

The method may further involve that any number of root support frames and spanwise support frames as well as further support frames are provided with legs extending upwards to provide support for additional root support frames and spanwise support frames to facilitate a predetermined number of blades to be stacked on top of each other adjacent to a number of stacked blades. This facilitates blade stacking not just in one stack, but in two or more adjacent stacks.

The method may also involve that the root support frames and spanwise support frames are connected to any root support frame and spanwise support frame supported by the root support frames and spanwise support frames, respectively. This secures the stacking of the blades, which may be necessary in rough sea.

Adjacent root support frames may also be connected, which secures the stacked blades even further.

The root support frames may include hinges allowing the blades to pivot around a horizontal axis at the blade root. By allowing the blades to pivot, compared to keeping the blade horizontal, facilitates a higher number of blades to be stacked in stacks, which are lower. When a lower blade is pivoted downwards, the tip end of the blade will be lower. This means that an oppositely pointing next upper blade may be placed with its root end lower as the lower blades tip end is lower etc.

A further or alternative aspect may involve that the blades are pre-bent. A pre-bent blade is a blade, where the blade, when mounted on a wind turbine, has a curvature in a direction facing the wind. The effect is, that a higher blade tip to tower distance is obtained. Such blades may also be transported and stacked according to the aforementioned methods and support frames. The curvature may be chosen in a way, where the blade tip end, when seen in a longitudinal direction of the blade, is within a diameter of the blade root end. The curvature may be also be chosen in a way, where the blade tip end, when seen in a longitudinal direction of the blade, is outside a diameter of the blade root end. When the tip end is within a diameter of the root end, this may have a minimum impact on stacking of blades. I.e. the stacking sequence may be freely chosen. When the tip end is outside a diameter of the blade root end, this may cause restraints on the stacking sequence to obtain a compact stacking. This may involve, that two or three blades in a sequence is stacked with the tip ends facing a same direction and following blades in the stacking sequence is facing in an opposite direction.

BRIEF DESCRIPTION OF THE FIGURES

Aspects according to the invention will now be described in more detail with regard to the accompanying figures. The figures show one way of implementing the present invention and is not to be construed as being limiting to other possible embodiments falling within the scope of the attached claim set.

DETAILED DESCRIPTION

Figure 1:
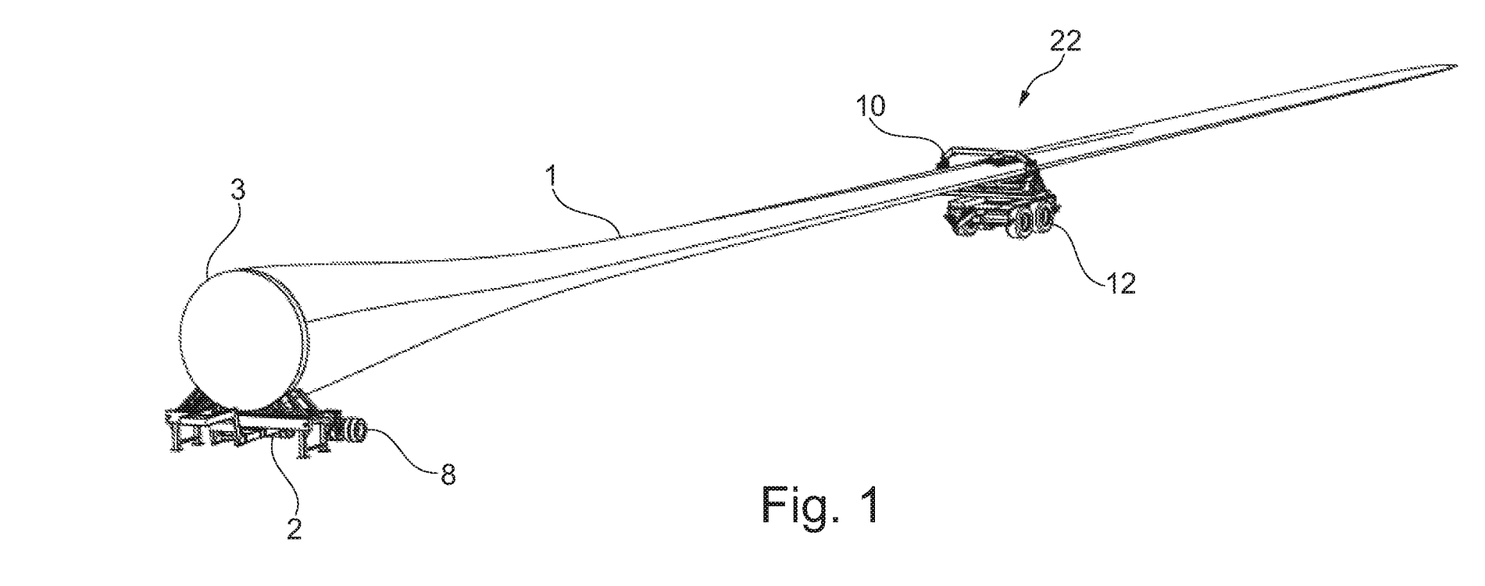
FIG. 1 is a perspective view of a blade fitted with equipment for transport.

FIG. 1 displays a blade 1 for a wind turbine generator. In order to transport the blade, a blade root support frame 2 is attached to a root flange 3 of the blade. A spanwise support 22 supports the blade 1 and includes a cradle-like support part 10 for gripping the blade. A first wheel base 12 is connected to the spanwise support 22 for transportation. Also for transportation, is a transport unit 8 connected to the blade root support frame. In order to supply power for transportation a not shown truck, semitruck or tractor is connected to the transport unit. More details are given below.

Figure 2A:
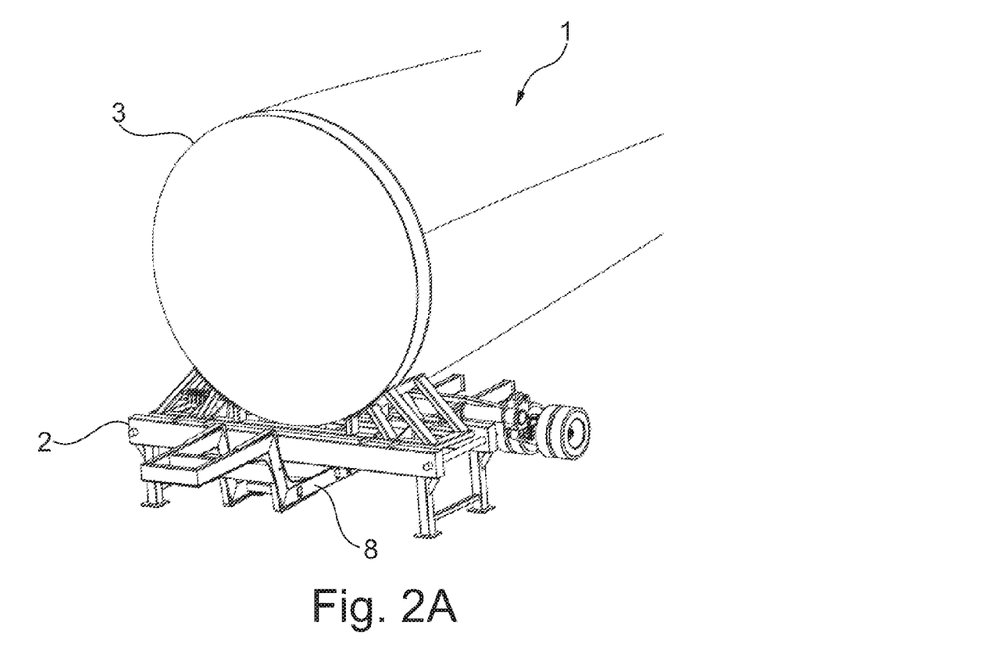
FIGS. 2A and 2B are perspective views of a blade root fitted with a blade root support frame and a transport unit.
Figure 2B:
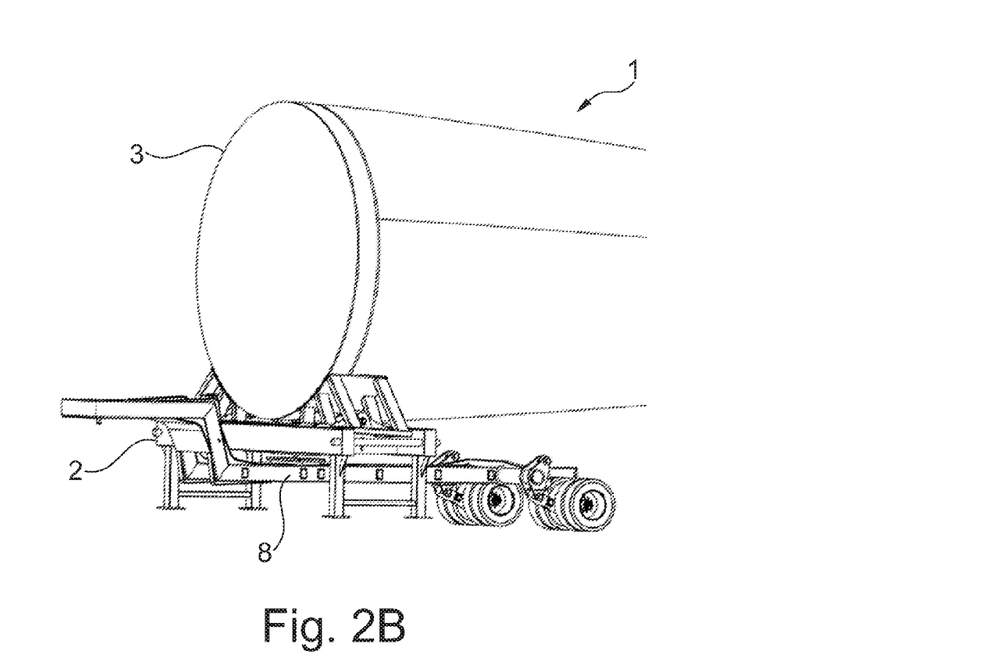

FIGS. 2A and 2B show the blade 1 having a root flange 3 connected to a root support frame 2. A transport unit 8 is connected to the support frame 2.

Figure 3A:
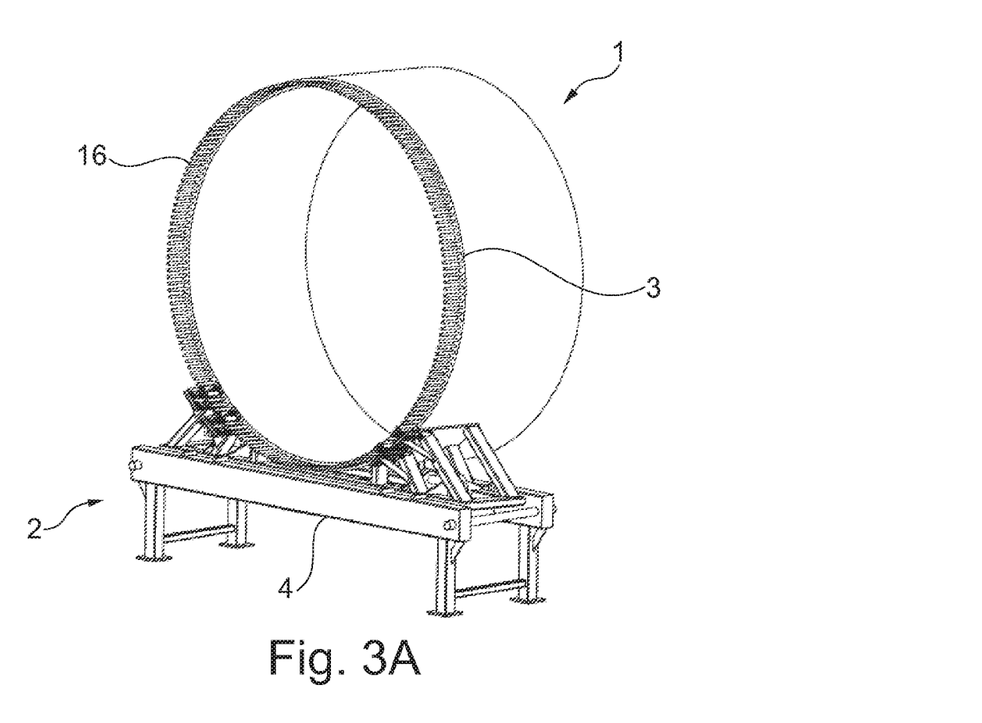
FIGS. 3A and 3B are perspective views of a blade root fitted with a blade root support frame.
Figure 3B:
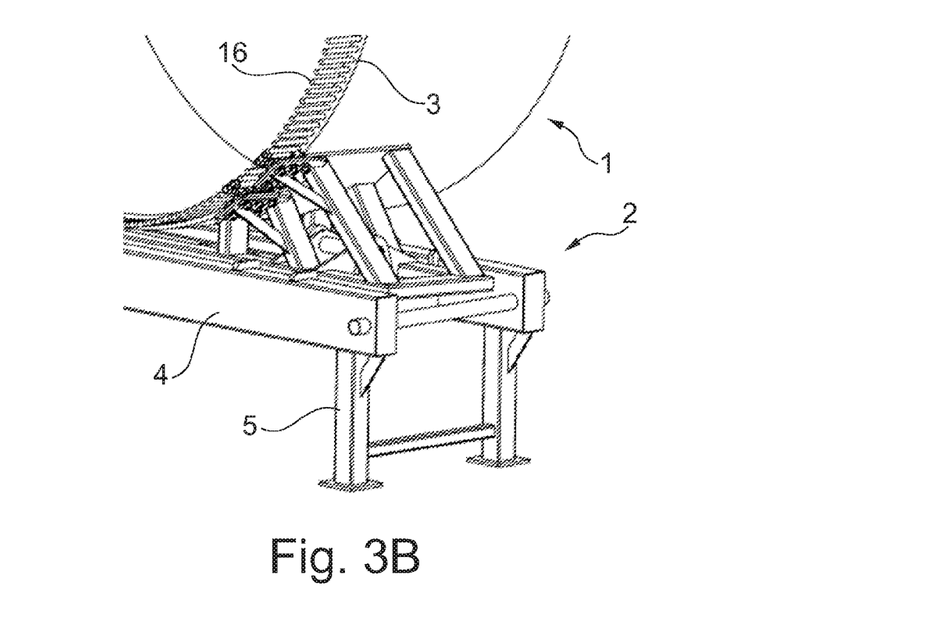

FIGS. 3A and 3B show a blade 1 root with a root flange 3 having inserted stud bolts 16. The stud bolts are used for connecting the blade to a not shown wind turbine hub. A root support frame 2 including a main support part 4 is connected to the blade 1 using the flange 3 and the stud bolts 16. The main support part 4 is supported by legs 5. The legs 5 are here shown as non-movable, but may, not shown, be configured to be movable, e.g. telescopic or pivotable, between at least a support position, a transport position and a lifting position as well as vice versa, and where movement of the legs is performed manually or using a power source.

Figure 4A:
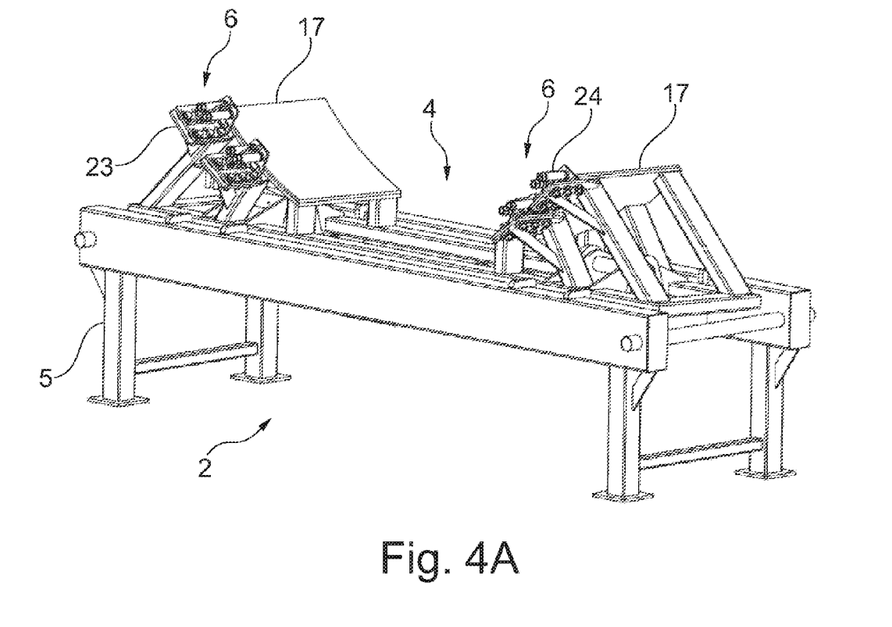
FIGS. 4A and 4B are perspective views of a blade root support frame.
Figure 4B:
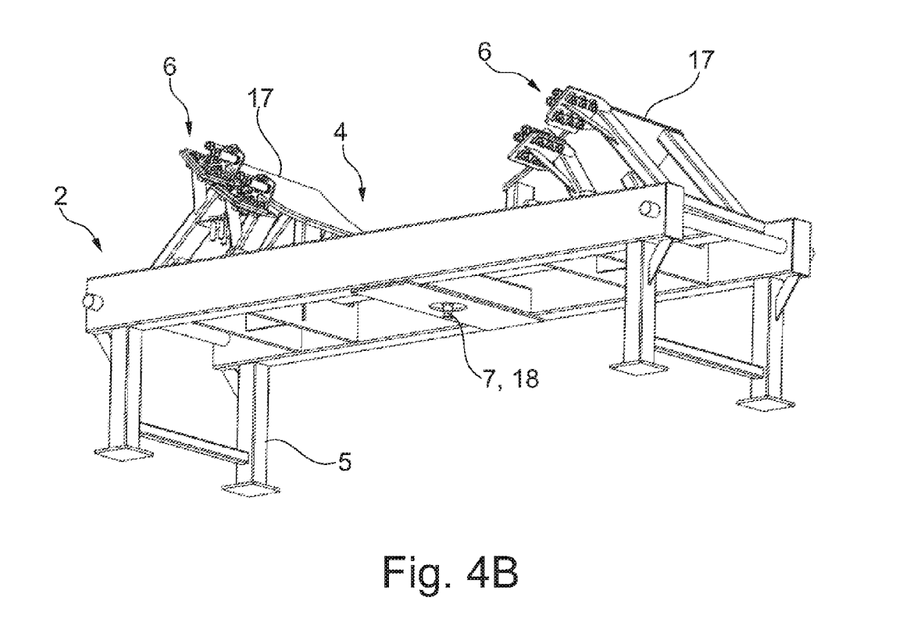

FIGS. 4A and 4B show blade root support frame 2. The root support frame includes a main support frame 4 supported by legs 5 as well as attachment parts 6 for attachment to a blade root. The attachment part 6 includes attachment means 23, which here are shown as tubular structures 24 for receiving stud bolts from a blade root. When the stud bolts are received by the tubular structures, they are fixated with not shown bolt nuts. In order to decrease the load from the blade root flange and the stud bolts, the blade root may rest on support plates 17, which adapted to conform to the blade contour. A coupling part 7, which here is shown as a king pin 18, may be used for connecting a transport unit to the root support frame 2.

Figure 5A:
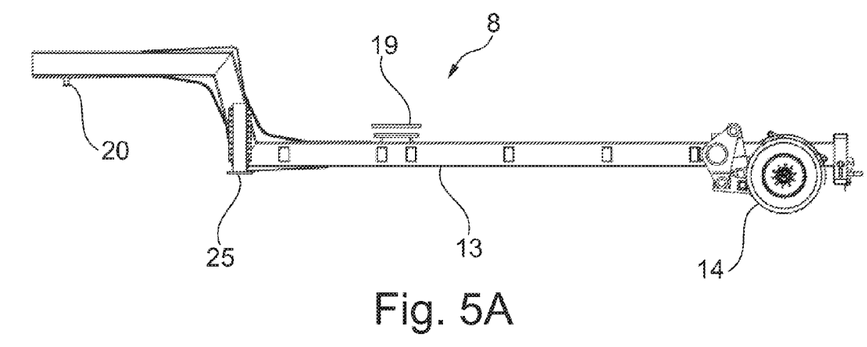
FIG. 5A is a side view of a transport unit.
Figure 5B:
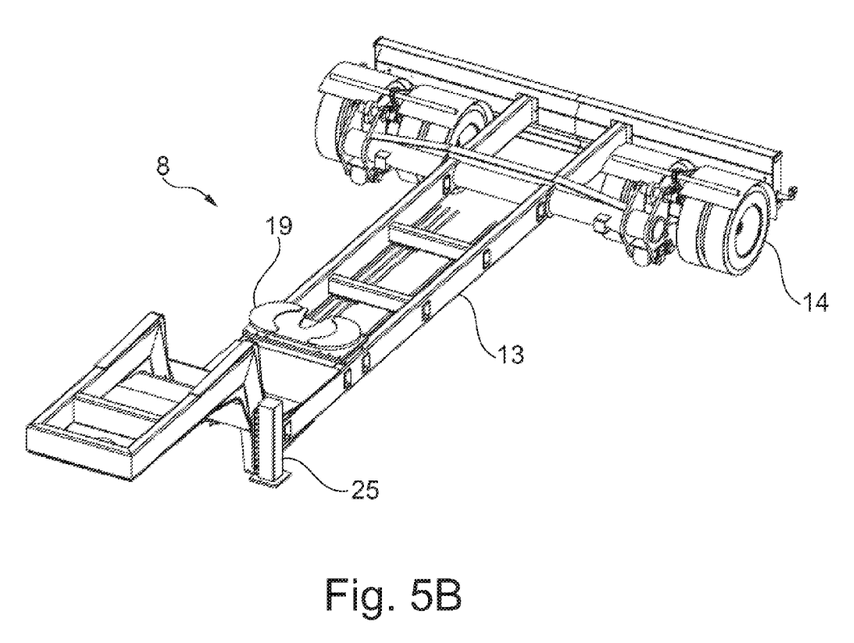
FIG. 5B is a perspective view of a transport unit.

FIGS. 5A and 5B show a transport unit 8 including a carrying structure 13 and a second wheel base 14. The transport unit further includes a fifth wheel coupling 19 for connection to a coupling part 7 of a blade root support frame 2. The carrying structure 13 include a king pin 20 located in an opposite end of the transport unit relative to the second wheel base 14. The coupling 19 is located between the king pin 20 and the wheel base 14 in order that a load of the blade is distributed between the wheel base 14 and a not shown truck or tractor. The carrying structure 13 further includes legs 25, which may be lowered. When the legs 25 are lowered, the front end of the transport unit may rest on the legs. And the king pin be situated in vertical position for connected and disconnecting a truck or tractor. The transport unit 8 is, before being connected to the root support frame 2, moved into a position partly underneath the blade root as shown in FIGS. 2A and 2B, where the second wheel base 14 is underneath the blade 1 and the carrying structure 13 is underneath the root support frame 2. A truck or tractor provides means for lifting and lowering the blade root via the root support frame 2 via the transport unit 8. Alternatively, the fifth wheel coupling 19 may be arranged on a not shown lift located on the carrying structure. In this way, a truck or tractor without lifting means may be used. Instead the truck or tractor functions as support along with the second wheel base, such that the lift may be used for lifting the root support frame and hence the blade root. Hydraulic power may be supplied from a pump located on the transport unit.

Figure 6A:
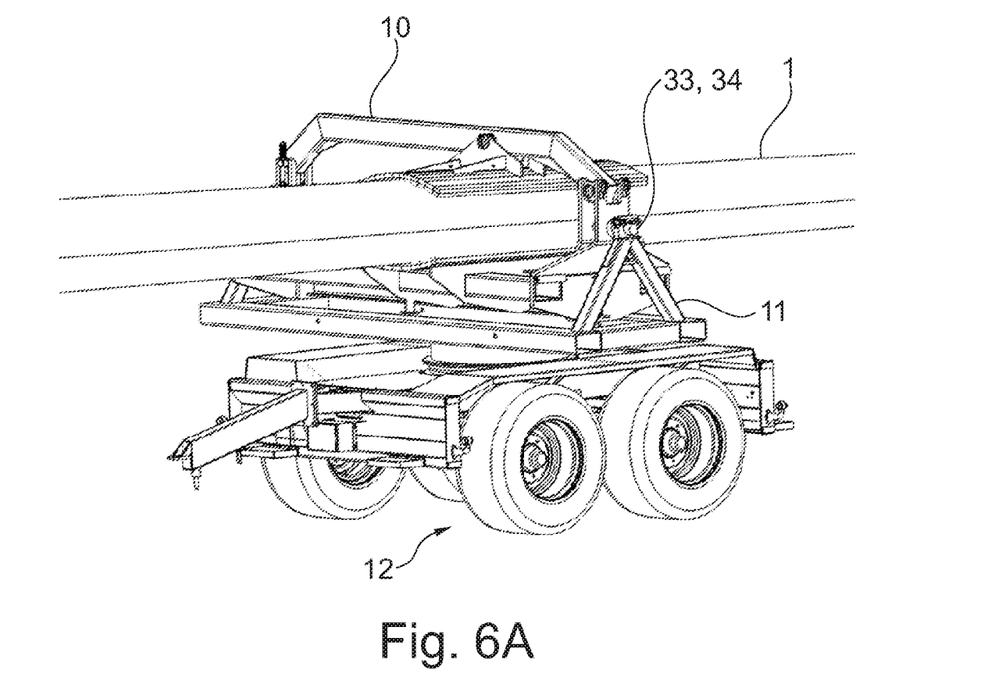
FIG. 6A is a perspective view of a blade spanwise support frame holding a blade and being fitted with a first wheel base.
Figure 6B:
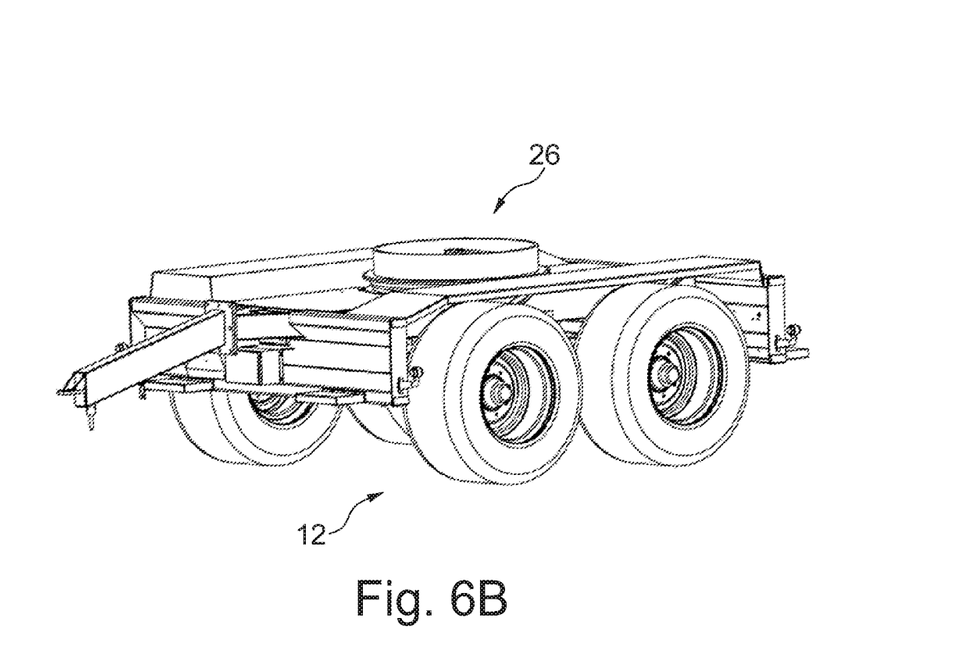
FIG. 6B is a perspective view of a wheel base.

FIG. 6A shows a blade spanwise support frame 11 attached to a spanwise portion of the blade 1, where the spanwise support frame includes a cradle-like support part 10 adapted to engage and support the spanwise surface part of the blade. The spanwise support frame 11 includes a not shown receiving part arranged for receiving a first wheel base 12. The spanwise support frame includes hinges 34 arranged to cooperate with shafts 33 on the cradle-like support 10 to form a bearing, which allows the cradle-like support to pivot around a horizontal axis, which is traverse to a blade longitudinal axis. As shown in FIG. 6B, the wheel base 12 include a rotation bearing 26, which is provided to allow the spanwise support frame to turn relative to the wheel base 12 in a horizontal plane. Hence, the cradle-like support may pivot and turn in directions allowing the passage of road turns as well as bumps, hills and valleys. The first wheel base 12 is preferably remotely controlled and includes a not shown battery or fuel driven generator for providing power to drive and maneuver the wheel base. To connect the first wheel base 12, part of the blade and the spanwise support frame may be lifted upwards and away from ground before the first wheel base is connected. Alternatively, the spanwise support frame 11 may include two legs, which are movable between at least a support position, transport position and a lifting position as well as vice versa, and where movement of the legs is performed manually or using a power source. This may be used to lift the blade 1 and support frame 11 to allow the first wheel base 12 to be connected or disconnected. Moreover, the wheel base 12 may be provided with lifting means, such as e.g. included in a pneumatic wheel suspension.

Figure 7A:
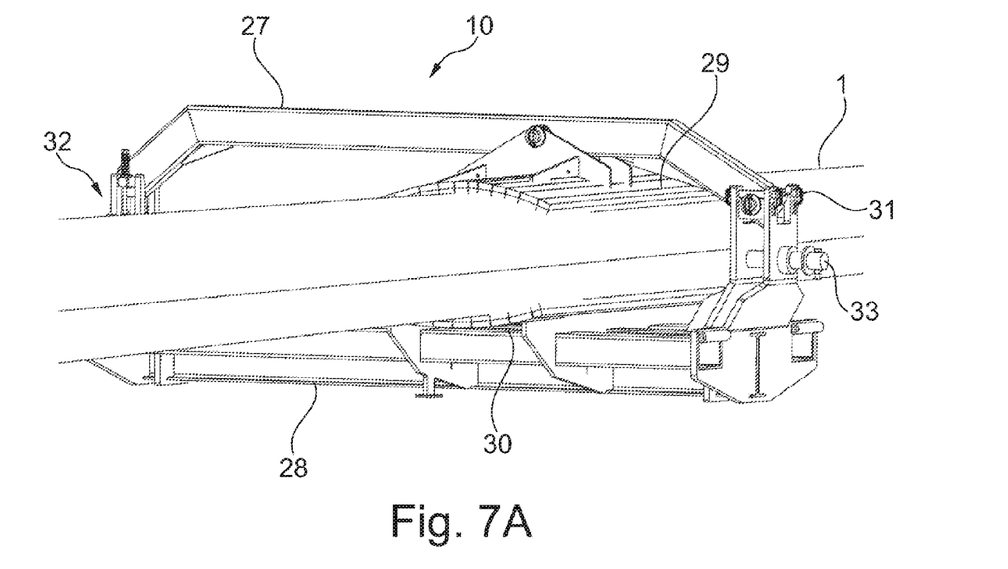
FIG. 7A is a perspective view of a cradle-like support part holding a blade.
Figure 7B:
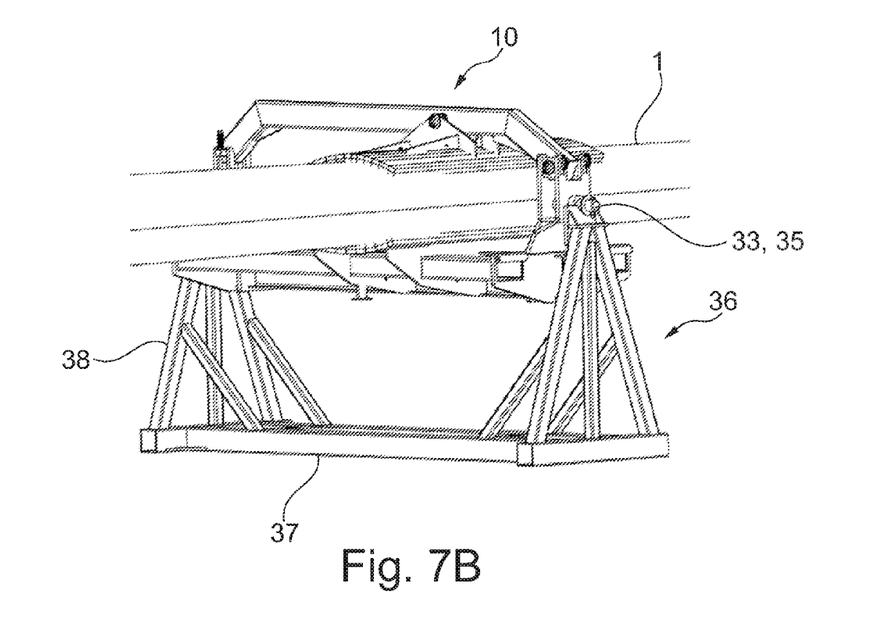
FIG. 7B is a perspective view of a cradle-like support part holding a blade and being placed in a storage frame supported by legs.

FIGS. 7A and 7B show a cradle-like support 10 attached to a blade 1. The cradle-like support includes an upper arm 27 having a pivotable upper support plate 29 and a lower arm 28 having a pivotable support plate 30. The support plates 29, 30 conform to the contour of the spanwise section of the blade 1. The upper and lower arms, 27, 28 are connected by a hinge 31 and locked by a clamp 32. A shaft 33 is provided for pivotable connection to a remaining part of a spanwise support frame. In FIG. 7B is a storage support 36 shown, which is engaging a cradle-like support 10. In this way the spanwise support 22, excluding the cradle-like support 10, may stay with the first wheel base 12, which may be a less costly solution as a connection to the rotation bearing may be expensive. The storage support 36 may be less costly. The storage support 36 includes a frame 37, legs 38 and receiving portions 35 for receiving shafts 33 of the cradle-like support.

Figure 8:
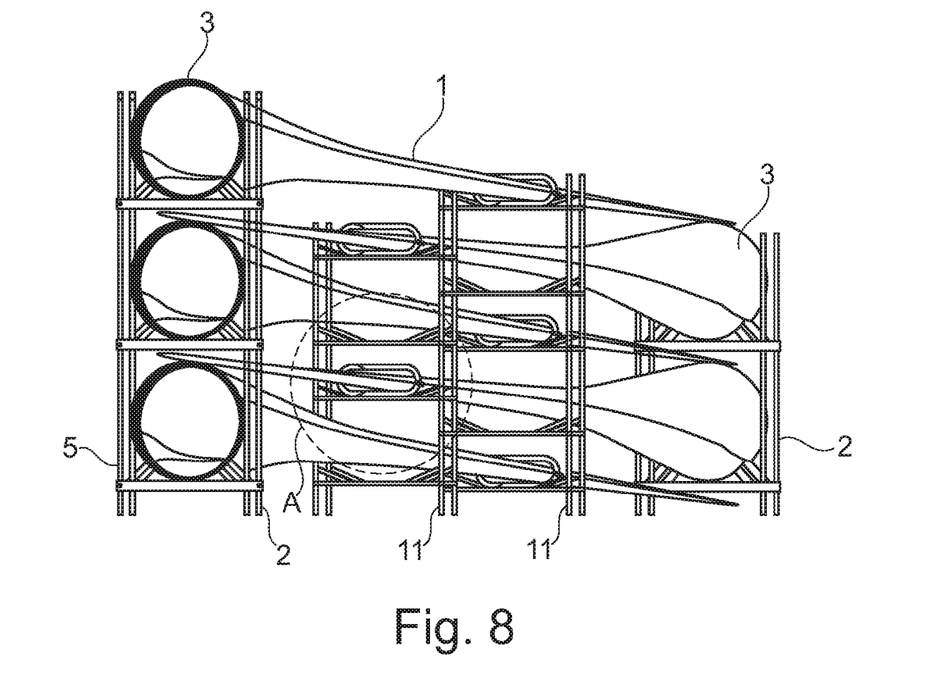
FIG. 8 is a perspective view of a number of blades stacked on top of each other.

FIG. 8 shows stacked blades. In this configuration, it is chosen not only have the legs 5 point downwards, but also upwards. The latter means that the upwards pointing legs may provide support for an upper blade 1. The legs 5 of one root support frame 2 by the root ends 3 are connected to the legs 5 of the upper support frame for the upper blade. The connection may be a bolt connection or a twist and lock connections as known for standard 20 and 40 foot shipment containers. The spanwise support frames 11 are also provided with legs pointing down as well as up. Again, this is to provide support for a spanwise support frame of an upper blade. As the spanwise support frames are not placed by the half length of the blades, the will be a distance between the spanwise support frames for each layer in the stack. This is solved by adapting the lengths of the upwards legs 5 according the actual blades location in the stack. The legs 5 of one spanwise support frame 11 are connected to the legs 5 of the upper support frame for the upper blade. The connection may be a bolt connection or a twist and lock connections as known for standard 20 and 40 foot shipment containers.

Figure 9:
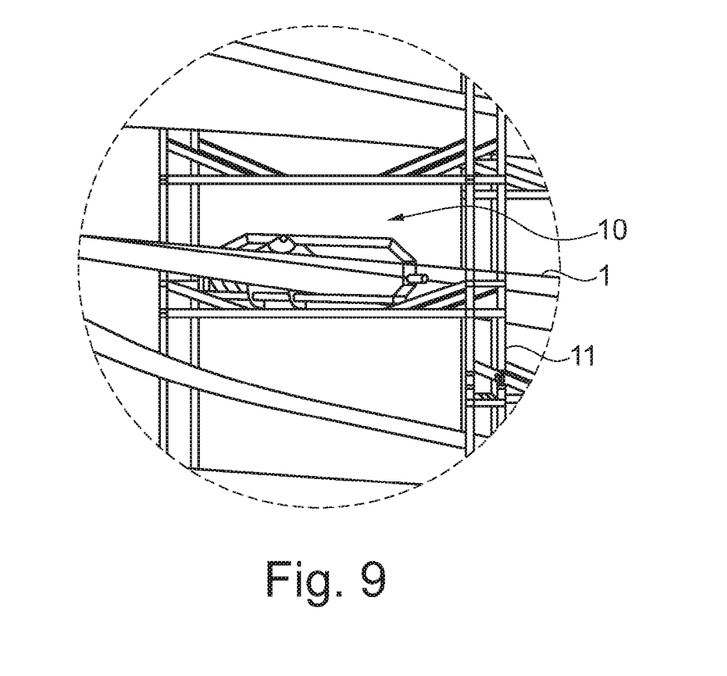
FIG. 9 is an enlargement of view A of FIG. 8.

In FIG. 9 it is shown how the spanwise section of the blade 1 is supported by a cradle-like support 10, which is a part of the spanwise support 11.

The support structures 2 and 11 may hereby be used for transport at a manufacturing site, away for road or train transport as well as be used as a stacking system without further framework. This is a great ease as reloading of the blades is greatly reduced, but also provide significant savings in equipment for handling, transporting and stacking.

Figure 10:
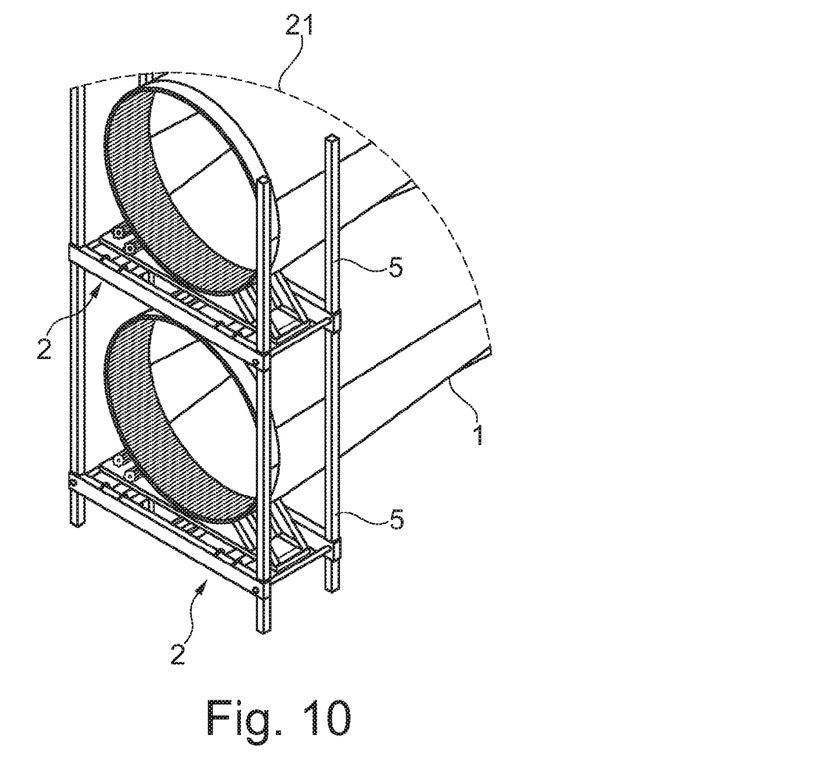
FIG. 10 is a partial, perspective of stacked blades.

FIG. 10 shows two stacked blades, a lower blade 1 and an upper blade 21. The blades are stacked using root end support frames 2 having legs 5 with a length adapted to suit the diameter of the blade root end.

Figure 11:
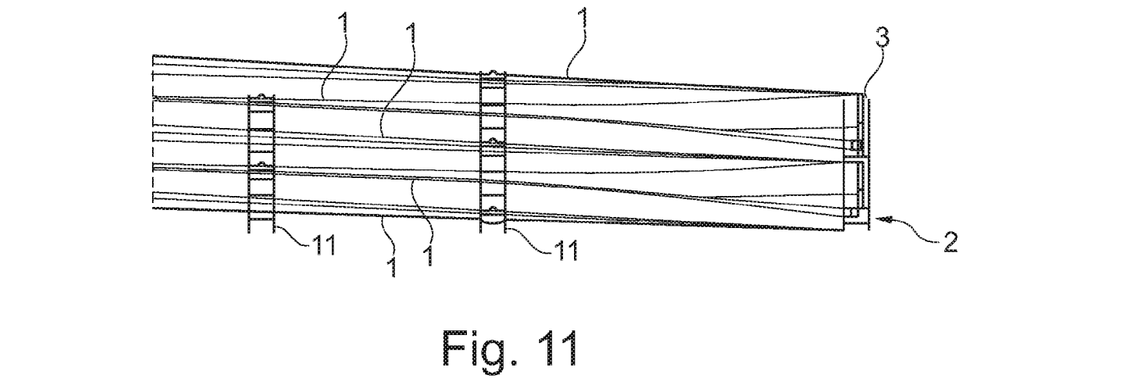
FIG. 11 is a side view of stacked blades.

FIG. 11 shows five stacked blades 1 seen from the side. Spanwise supporting frames 11 support the blade as well as root support frames 2 located at the blade roots 3.

Figure 12:
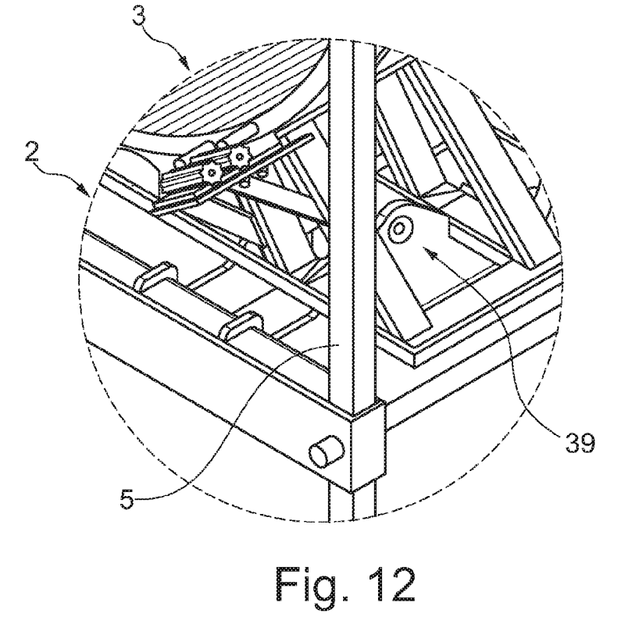
FIG. 12 is a partial, perspective view of the root frame of a stacked blade.

FIG. 12 is a detailed and enlarged view of a root support connection 2, which is support a root end 3. The upward part of a leg 5 is shown. The root support frame 2 may have a hinge 39, so the entire blade may pivot at the blade root.

Figure 13:
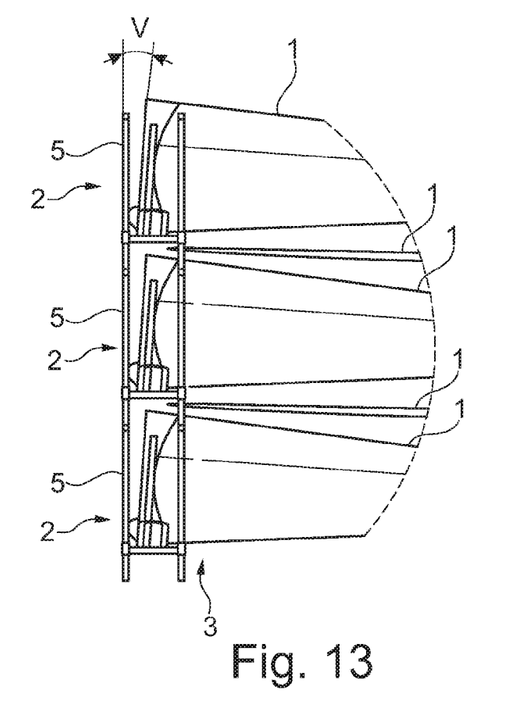
FIG. 13 is a partial side view of stacking of blade root ends.

FIG. 13 shows five stacked blades 1 each having a root support frame 2 at the root end 3. Legs 5 of the root support frames 2 provide the framework for stacking the blades. As can be seen from the angle V, the blades 1 are pivoted slightly. A closer stacking is hereby obtained compared to stacking the blades in a purely horizontal manner. The lowered tip of a lower blade gives space to place the root end of a next upper blade lower and so on. This reduces the height of a stack of a given number of stacked blades.

Figure 14:
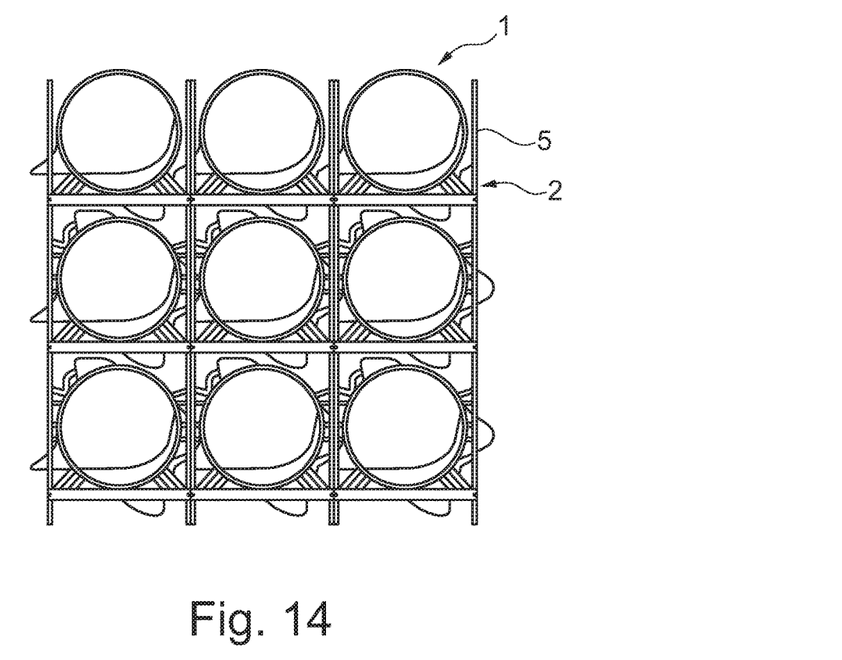
FIGS. 14 and 15 are opposite end views of stacked blades.
Figure 15:
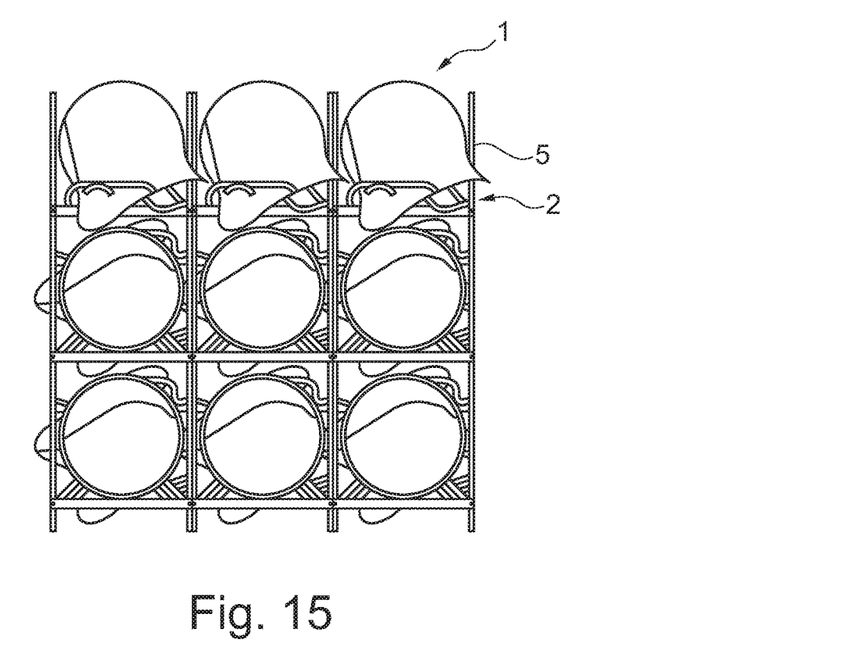

FIGS. 14 and 15 show three adjacent stacks of blades 1. The blades are stacked in vertical direction as alternating tip end pointing to a root end of and underlying blade, respectively. The supports 2 and legs 5 form part of a substantially complete stacking structure for sea transport. Fifteen blades are stacked in total in the three stacks. However, additional adjacent stacks could be positioned by the shown stacking as well as further blades in the height.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of transporting a blade for a wind turbine generator, the method comprising:
   attaching a blade root support frame to a root flange of the blade, where the root support frame includes a main support part, which is supported by at least two legs, and an attachment part adapted for being attached to the root flange of the blade, and a coupling part arranged for being connected to a transport unit,
   attaching a blade spanwise support frame to a spanwise portion of the blade, where the spanwise support frame includes a cradle-like support part adapted to engage and support a spanwise surface part of the blade, and where the spanwise support frame is arranged for receiving a first wheel base with at least one axle and two wheels,
   connecting the first wheel base to the spanwise support frame, and
   connecting a transport unit to the root support frame, where the transport unit includes a carrying structure and at least one second wheel base with at least one axle and two wheels,
   where the transport unit before being connected to the root support frame is moved into a position partly underneath the blade root, and where the second wheel base is underneath the blade and the carrying structure is underneath the root support frame.

2. The method according to claim 1, where the cradle-like support part and/or the root support frame is supported by at least two legs, which are movable between at least a support position and a transport position as well as vice versa, and where movement of the legs is performed manually or using a power source.

3. The method according to claim 1, where the blade root flange is fitted with a plurality of blade stud bolts and the attachment part of the root support frame is attached to the blade stud bolts.

4. The method according to claim 1, where the root support frame includes at least one support plate arranged for supporting a blade root portion and carrying at least part of a weight of the blade.

5. The method according to claim 1, where the coupling part includes a king pin arranged for engagement with a fifth wheel coupling.

6. The method according to claim 5, where the carrying structure of the transport unit has a fifth wheel coupling for engagement with the king pin on the root support frame.

7. The method according to claim 6, where the fifth wheel coupling is arranged on a lift located on the carrying structure.

8. The method according to claim 1, where the transport unit has a king pin arranged on the carrying structure, where the king pin is located away from the blade, for engagement with a truck or tractor for transportation.

9. The method according to claim 8, where the truck or tractor comprises means for lifting and lowering the blade root via the root support frame.

10. The method according to claim 1, where, when the blade is to be transported, the transport unit and the first wheel base are connected to the root support frame and the spanwise support frame, respectively, and a truck or tractor is engaged with the transport unit.

11. The method according to claim 10, where the blade root including the root support frame is lifted upwards and away from ground before transport.

12. The method according to claim 10, where part of the blade and the spanwise support frame is lifted upwards and away from ground before the first wheel base is connected.

13. The method according to claim 12, where part of the blade and the spanwise support frame is lifted upwards and away from ground before the first wheel base is connected, where the lift is performed by extending the at least two legs to a blade lifting position, which is higher than a support position.

14. The method according to claim 1, where the root support frame and the spanwise support frame are attached to the blade before the blade is transported away from a site of manufacture of the blade.

15. The method according to claim 1, wherein the root support frame and the spanwise support frame remain attached to the blade for road transport and/or sea transport and/or rail transport as well as any interim temporary storage, until the blade is to be installed on a wind turbine, where the blade is attached to a crane and the root support frame and the spanwise support frame are removed.

16. The method according to claim 1, wherein the root support frame and the spanwise support frame comprise legs extending upwards to provide support for a further root support frame and spanwise support frame, where the legs extending upwards provide support for legs extending downwards of the further root support frame and spanwise support frame, and wherein lengths of the respective ones of the legs extending upwards and legs extending downwards of the root support frame and spanwise support frame as well as the further root support frame and spanwise support frame are adapted to facilitate stacking of a lower blade and an upper blade on top of each other, and each blade being supported by the root support frame and spanwise support frame and the further root support frame and spanwise support frame, respectively.

17. The method according to claim 16, wherein the method comprises that any number of root support frames and spanwise support frames as well as further support frames are provided with legs extending upwards to provide support for additional root support frames and spanwise support frames to facilitate a predetermined number of blades to be stacked on top of each other.

18. The method according to claim 16, wherein the method comprises that any number of root support frames and spanwise support frames as well as further support frames are provided with legs extending upwards to provide support for additional root support frames and spanwise support frames to facilitate a predetermined number of blades to be stacked on top of each other adjacent to a number of stacked blades.

19. The method according to claim 16, wherein the root support frames and spanwise support frames are connected to any root support frame and spanwise support frame supported by the root support frames and spanwise support frames, respectively.

20. The method according to claim 18, wherein adjacent ones of the root support frames are connected.

21. The method according to claim 16, wherein the root support frames include hinges allowing the blades to pivot around a horizontal axis at the respective blade root.

22. A support and transportation kit for a wind turbine blade comprising:
a blade root support frame adapted to support a blade root portion, where the root support frame includes a main support part, which is supported by at least two legs, and an attachment part adapted for being attached to a root flange of the blade,
a coupling part arranged for being connected to a transport unit,
a blade spanwise support frame adapted to support a spanwise portion of the blade, where the spanwise support frame includes a cradle-like support part adapted to engage and support a spanwise surface part of the blade, and where a first wheel base with at least one axle and two wheels are attached to the spanwise support frame, and a transport unit adapted to be connected to the root support frame, where the transport unit includes a carrying structure and at least one second wheel base with at least one axle and two wheels, where the transport unit is configured to, before being connected to the root support frame, be moved into a position at least partly underneath the blade root, such that the second wheel base is underneath the blade and the carrying structure is underneath the root support frame.

23. The method according to claim 1, wherein the second wheel base is between the root flange of the blade and the first wheel base.

* * * * *